United States Patent [19]

Thaler et al.

[11] Patent Number: 4,726,653
[45] Date of Patent: Feb. 23, 1988

[54] STEREOSCOPIC VIEWER

[75] Inventors: Martin Thaler, Chicago, Ill.; Alan G. Lewis, West Linn, Oreg.; David M. Gresham, Chicago, Ill.

[73] Assignee: View-Master Ideal Group, Inc., Beaverton, Oreg.

[21] Appl. No.: 866,138

[22] Filed: May 22, 1986

[51] Int. Cl.$^4$ .................................................. G02B 27/22
[52] U.S. Cl. ............................................... 350/134; 350/133
[58] Field of Search ............... 350/130, 133, 134, 135, 350/141, 143; 354/212, 275

[56] References Cited

U.S. PATENT DOCUMENTS

| | | |
|---|---|---|
| 171,049 | 12/1853 | Romrell . |
| 174,902 | 6/1855 | Gilson . |
| 175,215 | 7/1855 | Gilson . |
| 184,356 | 2/1859 | Kellogg . |
| 185,670 | 7/1859 | Kellogg . |
| 189,006 | 10/1860 | Golden . |
| 2,189,285 | 2/1940 | Gruber . |
| 2,511,334 | 6/1950 | Gruber . |
| 2,674,920 | 4/1954 | Bennett ............................ 350/135 |
| 4,146,303 | 3/1979 | Baba ............................... 350/135 |

Primary Examiner—John K. Corbin
Assistant Examiner—Ronald M. Kachmarik
Attorney, Agent, or Firm—Klarquist, Sparkman, Campbell, Leigh & Whinston

[57] ABSTRACT

A stereoscopic viewer comprises a housing having an advancing plate for supporting and advancing a disc-shaped carrying card for stereo images which are viewed through a pair of eyepieces in the housing. A trigger oscillates the plate to incrementally rotate the card and position sequential pairs of images in the viewing axis of the eyepieces. The trigger includes a depressible actuator vertically projecting through a top surface of the viewer, as it is held for viewing. The trigger comprises a cylindrical actuator portion projecting through the top surface of the housing, and a leg depending from the actuator portion which engages the advancing plate to oscillate it as the trigger is depressed. As the plate oscillates in a forward direction, a flat front face of a pawl on the plate engages a radial slot on the disc to rotate it. The pawl is slightly inclined in the direction of advance of the card to help hold the card flat against the plate during incremental advancement. A rear element of the viewer is completely translucent to allow a greater amount of light into the interior of the housing and permit viewing of the mechanical actuation of the viewer.

13 Claims, 11 Drawing Figures

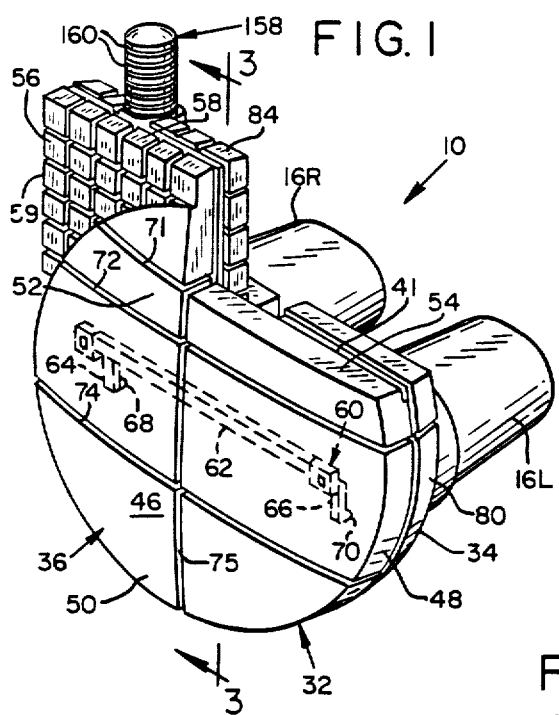
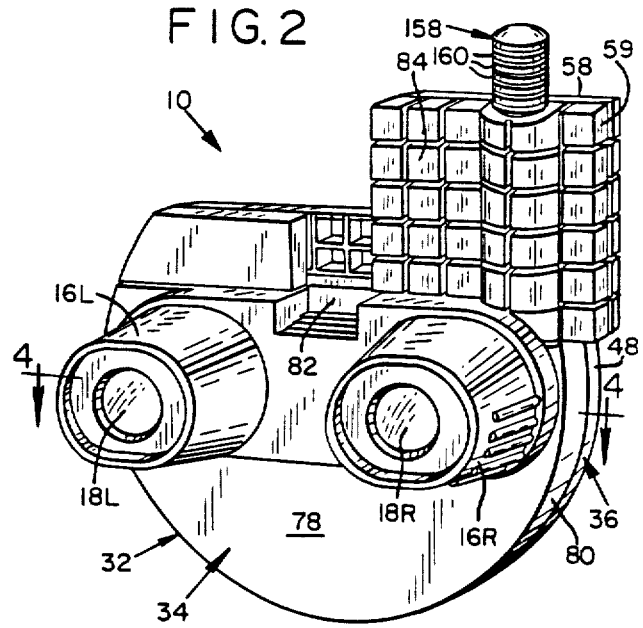
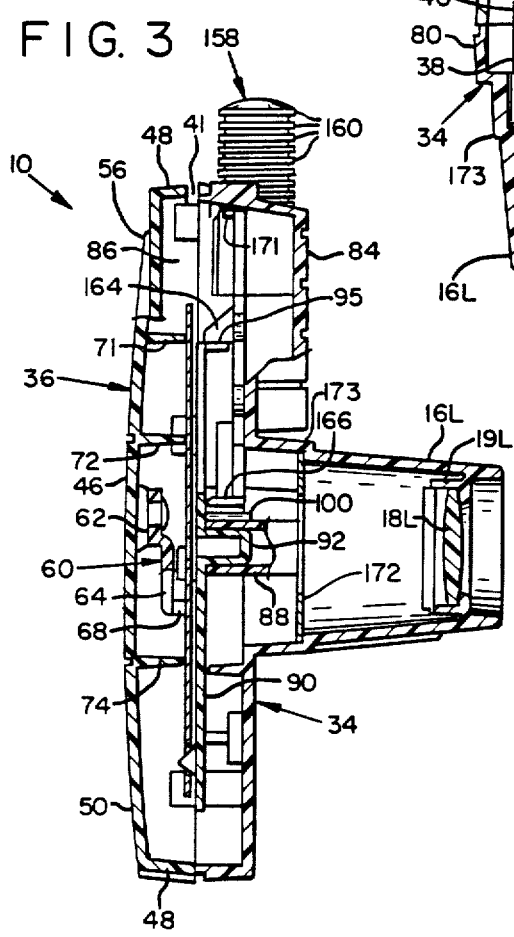
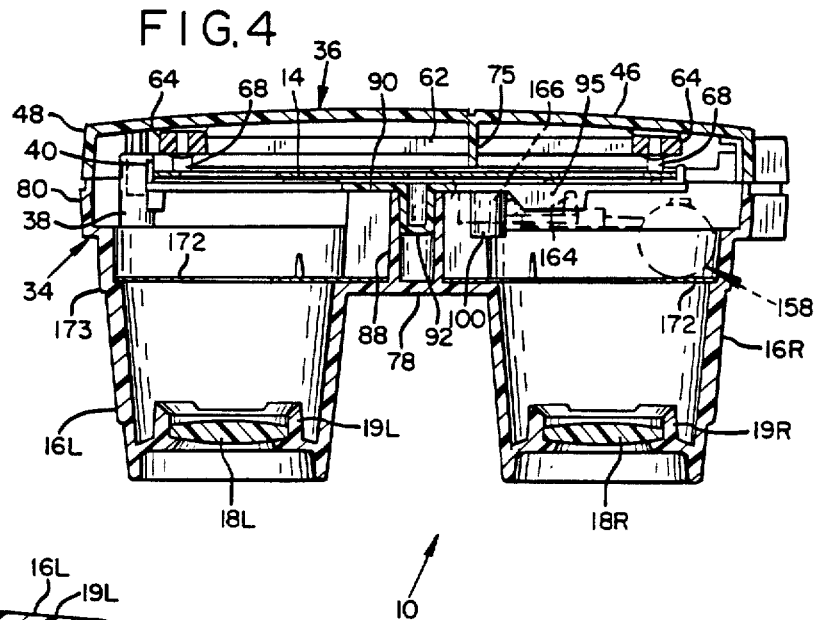
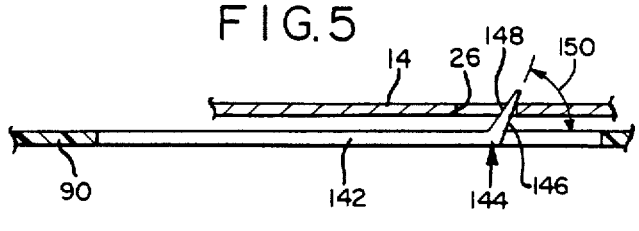

U.S. Patent   Feb. 23, 1988   Sheet 3 of 3   4,726,653
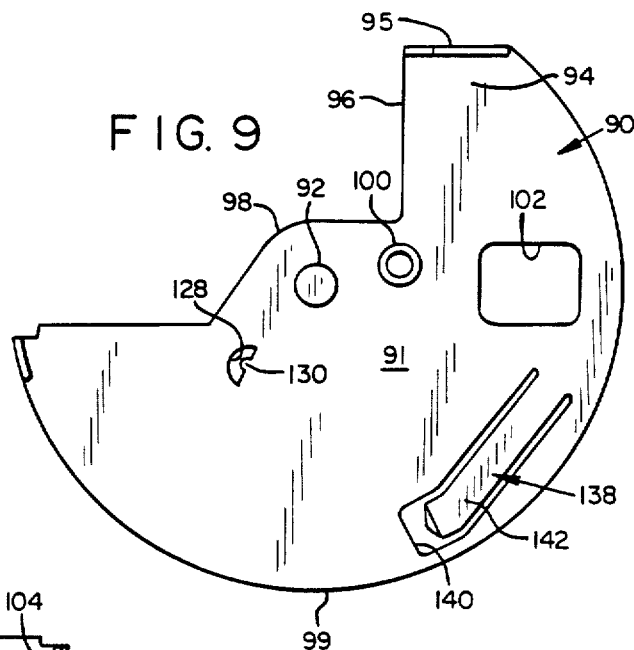
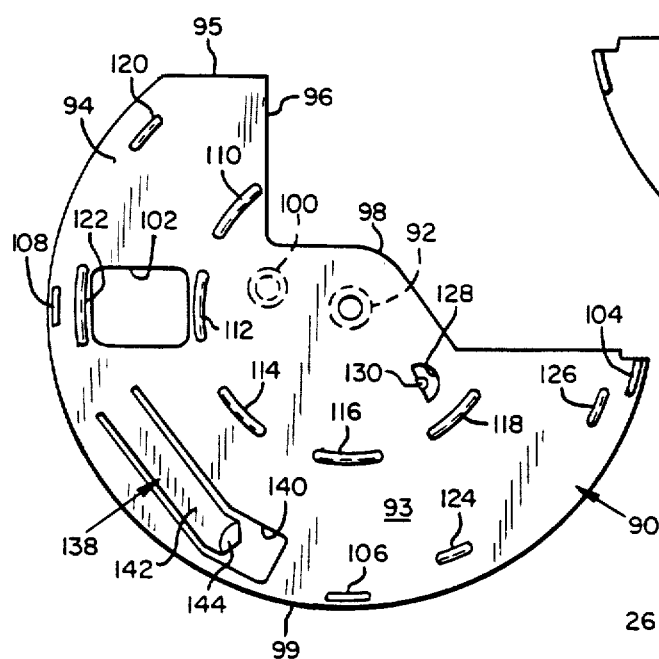
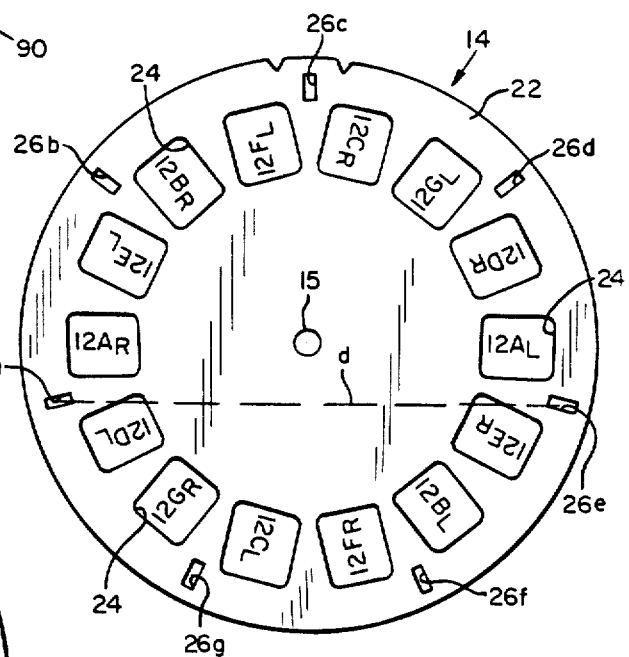
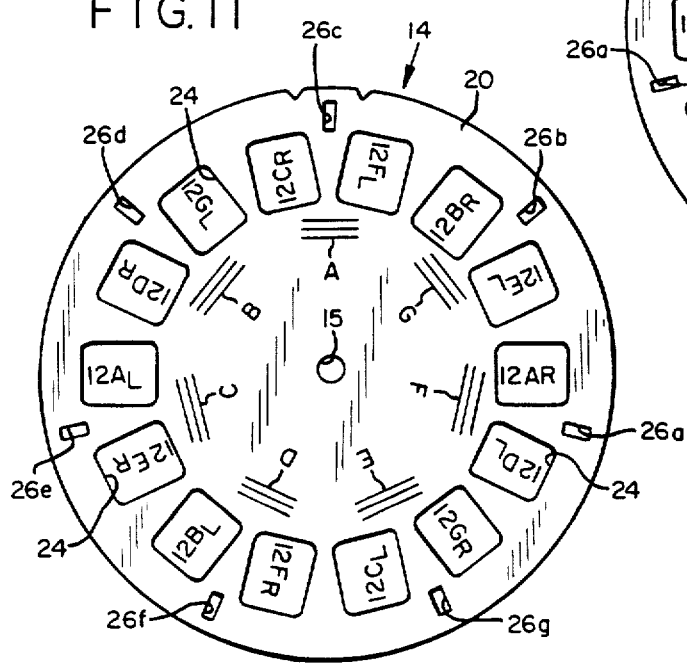

STEREOSCOPIC VIEWER

FIELD OF THE INVENTION

The present invention concerns an improvement in stereoscopic viewers. More particularly, the invention concerns a stereoscopic viewer for displaying pairs of stereo film images, which are peripherally arranged around a disc-shaped carrying card.

GENERAL DISCUSSION OF THE BACKGROUND

Hand-held stereoscopic viewers have previously been developed for viewing stereo pairs of images arranged on viewing cards. Examples of such viewers include the following U.S. design patent Nos. 171,049; 174,902; 175,215; 184,356; 185,670; and No. 189,006. Other patents, which describe the mechanical action of such viewers, include U.S. Nos. 2,189,285 and 2,511,334.

Each of the foregoing patents discloses a hand-held viewer comprising a housing with a pair of spaced eyepieces through the front of the housing. The eyepieces each carry magnifying lenses through which the stereo images are viewed at the focal plane of the lenses. The rear of the housing contains a translucent area behind the film images aligned with the viewing axes of the lenses for introducing light into the housing and illuminating the stereo images. The translucent area is usually made of a milky plastic that obscures the internal parts of the housing. An advancing mechanism is provided in many of the housings for incrementally moving the card to display sequential images through the lenses. These advancing mechanisms typically comprise an integral advancing plate and a sidewardly extending finger actuated trigger lever. Actuation of the trigger moves the advancing plate within the housing to bring a pawl on the plate into engagement with a slot in the card to incrementally advance the displayed images.

The small, translucent windows which permit light to enter the housing are usually spaced a substantial distance from the viewing card such that movement of the card cannot be detected through the windows. The windows also occupy a limited area of the housing, thereby admitting a small amount of light into the interior of the housing for illumination of the film images.

The side-extending trigger of existing viewers can be awkward to operate since it is difficult to grasp the viewer and reciprocate the trigger with the same hand. The sidewardly extending trigger of the prior art must be moved along a vertical slot through the side of the housing from the top to the bottom of the viewer to move the actuator plate. Such a movement requires that the housing be firmly grasped by both hands since manipulation of the sidewardly extending trigger interferes with the trigger hand's hold on the housing.

The advancing plate which incrementally advances the card for viewing sequential images usually contains a flexible arm having a terminal pawl that engages a slot on the card to advance the card as the trigger moves the plate. The pawl will only work effectively if the card is firmly retained against the plate so that the pawl will be retained in the slot during advancement. In the prior art, the card was held against the plate by ridges or projections inside the housing which abutted the card when the card was in place on the plate.

It is accordingly an object of the invention to provide in a stereo viewer of the type described a rotatable advancing plate having means to engage and rotate a disc-like viewing card while simultaneously gripping the card and holding it flat against the plate.

It is another object of the present invention to provide a viewer which admits a greater amount of light to the housing interior for illumination of stereo images being viewed.

Another object of the invention is to provide such a viewer in which rotation of the viewing card and movement of at least some internal parts can be detected by an operator who actuates the trigger.

Even yet another object is to provide a trigger on the viewer which can be more comfortably actuated by a single finger while grasping the viewer with the same hand that actuates the trigger.

SUMMARY OF THE INVENTION

In accordance with the invention, the foregoing objects are achieved by providing a stereoscopic viewer comprising a housing having an advancing plate for supporting and advancing a disc-shaped carrying card for stereo images. Pairs of stereo images are viewed through a pair of eyepieces provided in the housing. A trigger means is provided to rotate the card incrementally to position sequential pairs of images in the viewing axis of the eyepieces. The trigger means includes a depressible actuator vertically projecting through the top surface of the viewer, as it is held for viewing.

The advancing plate is oscillatable within the housing between a rest position in which a pair of stereo images is viewed, and an advanced position in which the plate carries the viewing card a distance sufficient to display the next sequential pair of images to the eyepieces. The plate includes a hub, a substantially circular side and bottom edge, a partially flat top edge, and a boss adjacent the hub. The trigger comprises a cylindrical actuator portion projecting through the top surface of the housing, and a leg depending from the actuator portion. The depending leg has a top finger engaging the partially flat top edge of the plate and a lower finger which comes into engagement with the boss shortly after the trigger is actuated. Initially depressing the cylindrical actuator portion of the trigger causes rotation of the plate by pushing the top finger downwardly against the partially flat top edge of the plate. The forward oscillation of the plate is completed by the lower finger which engages the boss and finishes moving the plate to its advanced position. When downward force on the trigger is released, a spring connected between the plate and viewer housing returns the plate to its rest position.

As the plate oscillates in a forward direction, a flat front face of a pawl on the plate engages a radial slot on the disc to rotate the disc. When downward pressure on the trigger is released, the plate is pulled back towards its rest position and a curved back face of the pawl allows it to disengage quickly from the slot. The card remains in an incrementally advanced position while the plate returns to its rest position. The pawl is slightly inclined in the direction of advance of the card to help hold the card flat against the plate during incremental advancement.

In preferred embodiments the viewer housing includes mating front and rear elements. The rear element preferably is completely translucent to allow a great amount of light into the interior of the housing to illuminate the stereo images for viewing through eyepieces in the front element and to permit viewing of the mechanical actuation of the viewer.

Other features and advantages of the present invention will be more readily ascertained from inspection of the accompanying drawings taken in connection with the following specification, wherein like numerals refer to like parts throughout.

BRIEF DESCRIPTION OF THE DRAWINGS

In the drawings:

FIG. 1 is a rear perspective view of the stereoscopic viewer of the present invention, a detent member carried by the rear face being shown in phantom.

FIG. 2 is a front perspective view of the stereoscopic viewer of FIG. 1.

FIG. 3 is an enlarged, vertical sectional view of the stereoscopic viewer taken along line 3—3 of FIG. 1 with parts broken away to show details of the advancing mechanism.

FIG. 4 is a horizontal sectional view taken along line 4—4 of FIG. 2 but with the position of the trigger being shown in dotted lines.

FIG. 5 is an enlarged fragmentary view taken along line 5—5 of FIG. 6 showing a pawl on the advancing plate engaging a slot on the image card.

FIG. 8 is a rear view of the advancing plate shown in FIG. 6.

FIG. 9 is a front view of the advancing plate shown in FIG. 8.

FIG. 10 is a rear view of the rotatable card which carries the stereo film images.

FIG. 11 is a front view of the card shown in FIG. 10, printed indicia on the card being shown schematically.

DETAILED DESCRIPTION OF THE PREFERRED EMBODIMENT

Figure 6:
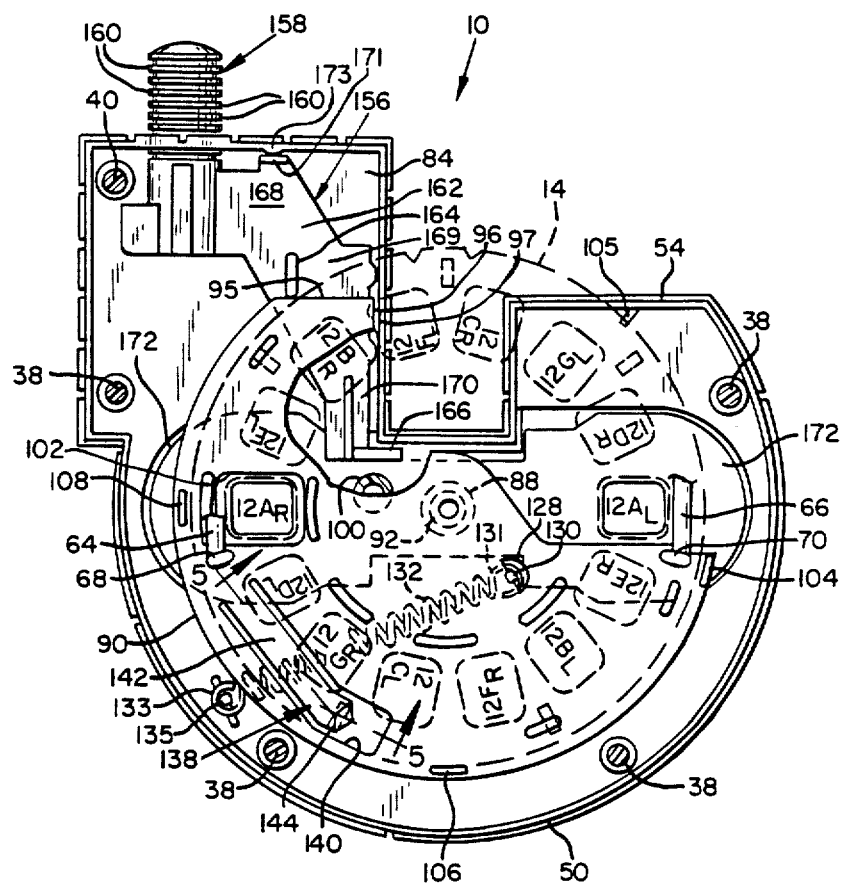
FIG. 6 is an enlarged, rear view of the viewer shown in FIG. 1, with the rear part of the housing removed, the advancing plate being in a rest position, the image card on the plate being shown in phantom, portions of the advancing plate being cut away and a spring behind the plate being shown in phantom.

A stereoscopic viewer 10 constructed in accordance with the invention is adapted sequentially to display a plurality of discrete transparent film images 12 equally spaced peripherally around the edge of a circular carrying card 14 such as illustrated in FIGS. 10 and 11. Film images 12 are arranged in stereo pairs so as to provide a stereoscopic effect when the pairs are viewed together through a pair of eyepieces 16L, 16R in the viewer 10 each having a magnifying lens 18L, 18R with a common focal plane. The lenses 18L, 18R are held within their respective eyepieces by retainers 19L, 19R (FIGS. 3 and 4) within the eyepieces 16L, 16R.

The mounting card of the present invention comprises an upper lamination 20 (FIG. 11) and a lower lamination 22 (FIG. 10), each lamination preferably being formed of smoothly finished, printable, thin fiberboard, the two being adhered to each other substantially throughout their contiguous surfaces to form a substantially rigid, yet somewhat flexible mounting card 14. The card is shaped like a disc so that the card can freely rotate within the viewer 10, the arcuate edges of the card also facilitating insertion into the viewer. The card 14 has a hole 15 at its center, and a plurality of substantially rectangular windows 24 equally spaced peripherally adjacent the edge of card 14. A plurality of left transparent images $12A_L$ through $12G_L$ are mounted in the windows 24 and a plurality of right transparent images $12A_R$ through $12G_R$ are mounted in the windows 24. As may be seen in FIGS. 10 and 11, each of the left images is mounted diametrically opposite the corresponding right images, images $12A_L$ being opposte $12A_R$, $12B_L$ opposite $12B_R$, etc. The transparencies are suitably secured between the laminations 20, 22. The centers of the right and left transparencies are spaced apart the average human interpupillary distance so that the pair of eyepiece lenses 18 in alignment therewith may be placed adjacent the eyes and the view seen in three dimension on an enlarged scale. There may be a lesser or greater number of pairs of transparencies, but seven pairs are sufficient to illustrate a simple story or to show representative scenes of a locality.

Images 12 are alternately oriented in windows 24 such that each immediately succeeding image is upside down as compared to the immediately preceding image on the card. For example, image $12A_L$ is upright and image $12E_R$ is upside down. This arrangement of images allows card 14 to be advanced by two windows (from $12A_L$ to $12B_L$) each time a trigger is depressed. Further details concerning the structure of the disc and reasons for orienting the images in this fashion are more fully explained in U.S. Pat. No. 2,189,285, which is incorporated by reference herein.

The card has seven equally spaced radial slots 26a through 26g therearound, one slot being positioned between each of the following pairs of windows 12: $A_L$ and $E_R$, $B_L$ and $F_R$, $C_L$ and $G_R$, $D_L$ and $A_R$, $E_L$ and $B_R$, $F_L$ and $C_R$, and $G_L$ and $D_R$. The slots are of equal length and are located between the peripheral edge of the card 14 and the windows 24. Seven separate groups of printed indicia A–G are provided on the face of upper lamination 20 comprising legends which correspond one to each of the pairs views shown by stereo images. Each legend is offset by an angle of about 90° from the pair of images to which it corresponds.

The viewer 10 comprises a hollow housing 32 (FIGS. 1 and 2), comprising a front element 34 and rear element 36 (FIGS. 1–4), the two elements meeting along a vertical parting plane. The elements 34, 36 are adapted to be molded of a suitable plastic such as high impact styrene. The front element 34 is molded from a pigmented plastic providing a desired color and rendering the element light opaque. Rear element 36, on the other hand, is molded of a plastic such that the element will be translucent. The front element 34 is provided with a plurality of fastener receiving sockets 8 (FIGS. 4. 6 and 7) extending perpendicularly to the parting plane and into which the opposed ends of prong fasteners 40 (FIG. 4) extending from rear element 36 may be forced to hold the two parts in assembled relation. The housing is thus held together without visible fastening means, but a knife blade may be inserted between the elements to separate them for repair of the interior mechanism. The sockets 38 and fasteners 40 are arranged around the bottom and sides of the housing 32 but are positioned such that a top slot 41 (FIGS. 2 and 3 is unobstructed for insertion of the card 14 therethrough.

The rear element 36 comprises a dish shaped substantially circular lower portion 46 from which extends a peripheral flange 48 (FIGS. 1 and 3). The top of the portion 46 is cut away on one side as may be seen in FIG. 1, a flange 54 extending horizontally from the top edge of the cutaway portion partially across the rear element 36 above the eyepiece 16L. A substantially rectangular finger grip defining portion 56 extends upwardly from the lower portion 46 above the eyepiece 16R. The finger grip defining portion 56 has a horizontal flat top flange 58 and a vertical side flange 59 and further includes square ribs for structural strength and gripping support.

The rear element 36 is preferably sufficiently translucent to allow visual detection of the card 14 and actuating elements within the housing 32 (described below). The large area of translucent plastic admits a great amount of light into the housing 32 for illumination of the film images 12 on the card 14.

A generally U-shaped detent member 60, shown in dotted lines in FIG. 1, is carried by the lower portion 46 in the interior of housing 32. The detent includes a horizontal attachment arm 62 that is suitably fixed to the interior face of the lower porton 46. A pair of resilient legs 64, 66 (FIGS. 1 and 6) extend perpendicularly downwardly from each end of the arm 62, each of the legs terminating in a detent knob 68, 70, each knob being in position for registering with a pair of opposed slots 26, such as slots 26a and 26e, in card 14 that are separated by a horizontal distance d (see FIG. 10). The detent member 60 thereby provides a means for selectively holding card 14 stationary with a pair of stereo images aligned in front of eyepieces 16R, 16L. The detent member 60 is especially important in helping hold the card 14 stationary as the plate on which the card 14 is placed returns from the advanced position of FIG. 7 to the rest position of FIG. 6.

Horizontal ribs 71, 72, 74 extend across the interior of rear face 46 in parallel relation to each other and to the top and bottom portions of flange 48. A vertical rib 75 extends across the rear face 46 perpendicularly to horizontal ribs 71, 72, 74. The free edges of ribs 71, 72, 74 and 75 define a common plane and help hold the card 14 in a viewing plane when the rear element 36 is in assembled relation to the remainder of the housing 32 (see FIG. 3).

The front element 34 is complementary in outline to the rear element 36 except for a cutaway portion 82 (FIG. 2) between eyepieces 16L, 16R to provide a view of the indicia A-G on the face of card 14. The front element includes a substantially flat face portion 78 from which project eyepieces 16R and 16L. A peripheral flange 80 projects rearwardly from the face portion 78 and mates with the flange 48 of the rear element 36.

The front element 34 also has a finger grip defining portion 84 (FIGS. 1, 2, 6 and 7) opposing the finger grip defining portion 56 of the rear element 36. The portions 56, 84 cooperatively define a trigger space 86 (FIG. 3) therebetween. The front element 34 is formed with an inwardly projecting cylindrical receptacle 88 (FIGS. 3 and 4) for receiving the hub 92 of an advancing plate 90.

The advancing plate 90 (FIGS. 8 and 9) is contained within the housing 32 for incrementally advancing the card 14 to display sequentially pairs of images 12. The plate 90 has a front face 91 and a rear face 93. The hub 92 projects perpendicularly from the face 91 into the receptacle 88, as best seen in FIGS. 3 and 4. The axis of the hub 92 is perpendicular to the parting plane of the housing 32 and the plate 90 oscillates, of course, about the same axis. The plate 90 oscillates between a rest position (shown in FIG. 6) in which the pair of images 12A$_R$, 12A$_L$ are viewed through eyepieces 16L, 16R, and an advanced position (FIG. 7) in which images 12B$_R$, 12B$_L$ have been rotated into position in front of the eyepieces 16L, 16R.

The plate 90 has a top trigger engaging portion 94 which projects into and partially across trigger space 86. The portion 94 has a top flanged stopping edge 95 and is cut away to define an edge 96 which is perpendicular to the edge 95 and parallel to the sidewall 97 of the housing 32 in the rest position of the plate.

The cutaway portion of plate 90 extends below cutaway portion 82 of the front element 34 and the position of an image 12 positioned in front of the eyepiece 16L, as best seen in FIG. 6. This configuration of the plate 90 prevents the plate from obstructing the first eyepiece 16L and printed indicia A-G on the card 14 when the plate is in its rest position. The balance of the edge 99 of the plate 90 is substantially arcuate and coaxial with the hub 92.

The plate 90 further includes a boss 100 (FIGS. 4, 6 and 7) projecting from the front surface of the plate adjacent the hub 92 and offset slightly to the left and above hub 92 as the plate 90 is viewed in FIG. 6. A rectangular window 102 is provided through plate 90, the window 102 being slightly larger than windows 24 and positioned to be in register with an image 12 in front of the eyepiece 16R when the plate 90 is in its rest position, as shown in FIG. 6. Three short, arcuate flanges 104, 106, 108 (FIG. 8) extend outwardly from the rear face 93 of plate 90 adjacent its periphery for holding the card 14 in place on the plate 90. The flange 104 also serves as a stop which abuts a stop flange 105 on the front element 34 (FIGS. 6 and 7) when the plate 90 reaches its fully advanced position, see FIG. 7. Also projecting from the rear face 93 of plate 90 is a series of ridges 110, 112, 114, 116, and 118 arranged along a semicircle around the center of the plate. The ridges 110-118 provide sliding surfaces of small contact area with a card 14 allowing the plate 90 to return to its rest position while leaving the card 14 in an advanced position. Similar raised ridges 120, 122, 124, and 126 are provided adjacent the semicircular edge of plate 90 for a similar reason.

A semicircular cutout 128 (FIGS. 8 and 9) through the plate 90 is positioned adjacent the ridge 118 and inside the semicircle formed by ridges 110-118. A hook 130 projects outwardly from the front face 91 of the plate 90 adjacent the cutout 128 for attachment of a first end 131 of a spring 132 (FIG. 6) thereto. The other free end 133 of the spring 132 is connected to an anchor 135 on the front element 34. The hook 130 is below hub 92 and on the far side of the axis of oscillation from the anchor 135. The spring 132 therefore biases the plate 90 toward the rest position shown in FIG. 6 and returns the plate to its rest position after it has been moved to the advanced position shown in FIG. 7.

Figure 7:
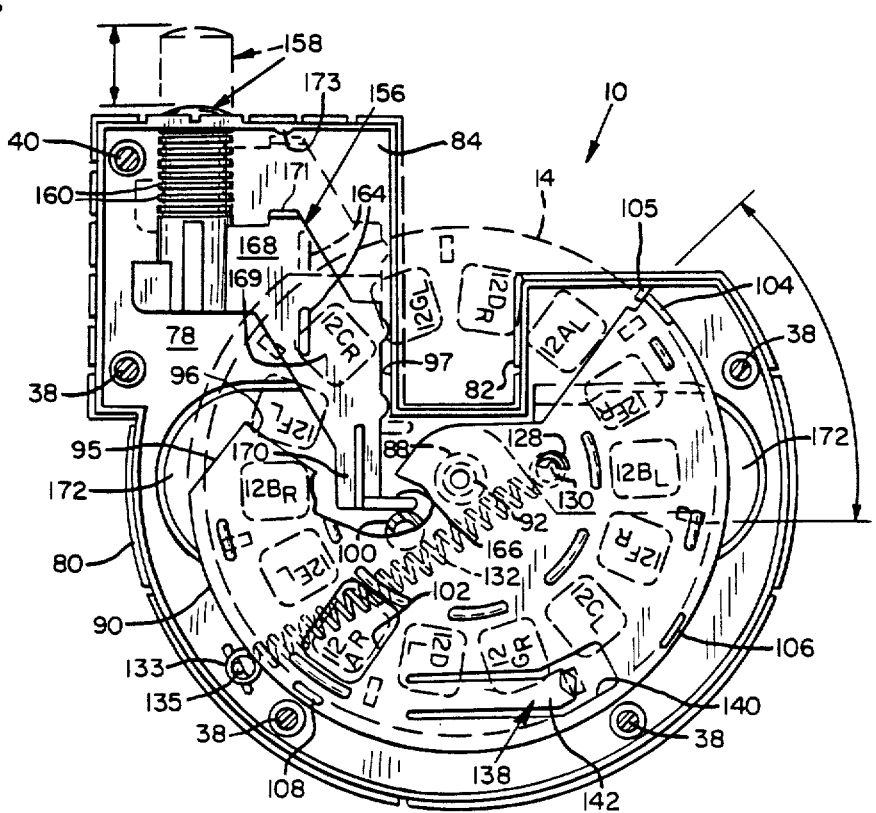
FIG. 7 is a rear view similar to FIG. 6, the trigger having been depressed and the advancing plate having moved to its advanced position, the spring not being shown.

A card engaging means 138 (FIGS. 5 and 6-9) is provided on the plate 90 for engaging and rotating the card 14 as the plate moves from its rest position of FIG. 6 to its advanced position of FIG. 7. The engaging means 138 includes an elongated cutout portion 140 in which a flexible arm 142 is carried, one end of the arm being integral with the plate 90. The arm 142 is substantially coplanar with the plate 90, except for a pawl 144 projecting outwardly from the face 93 of the plate 90 from the opposite end of the arm. The pawl 144 has a flat leading face 146 (FIG. 5) which engages an edge of the slot 26 to advance the card 14 when the plate 90 rotates from the rest position of FIG. 6 to the advanced position of FIG. 7. The trailing face 148 of the pawl 144 is arcuate in cross section and inclined from the arm 92 towards the face 146. The faces 146, 148 thus define a pointed pawl. The face 148 because of its slope provides relatively little resistance to disengagement of the pawl 144 from the slot 26 when the plate 90 begins to move back to its rest position under the influence of the spring 132. This easy disengagement is desirable since the card 14 must remain in its advanced position to display the sequential display of images.

The pawl 144 is inclined at an acute angle 150 (FIG. 5) to the plate. In the preferred embodiment shown in FIG. 5, the angle 150 is about 70°. Tilting the pawl 144 at such an angle helps grip the card 14 to the face 93 of the plate 90 and hold the card 14 in a desired plane of rotation as plate 90 oscillates towards the advanced position of FIG. 7. Conversely, the tilt of pawl 144 helps disengage the pawl from the slot 26 when the plate 90 begins to oscillate back to its rest position.

A trigger means 156 (FIGS. 6 and 7) is provided to rotate the plate 90 from the rest position of FIG. 6 to the advanced position of FIG. 7 and index the card 14. The trigger means 156 includes a cylindrical actuator 158 having a plurality of circular ridges 160 therearound and a plate-like leg 162 depending from the actuator 158. The actuator 158 projects substantially vertically upwardly through and above the top flat flange 80 of the finger grip portion 84. The leg 162 extends downwardly adjacent the front face of the advancing plate 90 and has a top finger 164 projecting perpendicularly from the leg 162 towards the plate 90 a sufficient distance for engaging the top flat edge 95 of the trigger engaging portion 94 of plate 90, and a lower finger 166 projecting parallel to the plate 90 a sufficient distance for engaging the top of the boss 100, see FIG. 6. The leg 162 comprises a horizontal segment 168, an angled segment 169, and a vertical segment 170. Projecting upwardly from the horizontal segment is a stop finger 171 which engages a button 173 on the top wall of the housing in the rest position of the advancing mechanism. When the plate 90 is in its rest position, the flat top edge 95 of the portion 94 engages the top finger 164, and the finger 166 is positioned slightly above the boss 100.

An opaque mask 172 (FIGS. 3, 4, 6, and 7) is provided within the housing 32 in front of the focal plane of the lenses 18R, 18L. The preferred position of the mask 172 is immediately adjacent the rear surface of the front face 78. The mask 172 has a pair of rectangular openings 174, 176 which correspond to the shape of the windows 24 in the card 14, the openings 174, 176 being slightly larger than the windows 24. In the preferred embodiment shown herein, the openings 174, 176 are a sufficient size and distance in front of the card 14 only to allow viewing of one framed image 12 through each lens 18. The mask 172 thereby prevents a user from seeing peripheral parts within the housing 32 that would distract his attention from the viewed image.

OPERATION

In operation, the card 14 is inserted edgewise through the slot 41 of the housing 32 so that the card 14 is received on the face 93 of the plate 80 and cradled thereon by the flanges 104, 106, 108. The card 14 is placed on the plate 90 with the lamination 22 flat against the face 93 such that written indicium A on the lamination 20 is visible through cutout portion 82, and the pawl 144 projects into one of the slots 26 of the card 14. As shown in FIG. 6, the card in this position will display the image $12A_R$ to the lens 18R of the eyepiece 16R and the image $12A_L$ to the lens 18L of the eyepiece 16L. The housing 32 is then grasped by one or both hands and the rear face 36 is supplied with a source of light, such as ambient room light. Light entering through the transculent rear face 36 of the housing 32 will illuminate the images 12A so that they can be magnified and clearly viewed by one who places lenses 18 in front of his eyes.

If the user wants to index the card 14 to display the images 12B through the lenses 18, the index finger of a trigger hand can be used to depress the actuator 158 without releasing the trigger hand's grasp on the housing 32. Depression of the actuator 158 forces the top finger 164 downwardly on the edge 95 of the plate 90 which begins rotation of the plate in a counterclockwise direction as viewed in FIG. 6. As depression of the actuator 158 continues, the finger 164 slides across the edge 95 towards the edge 96. By the time the finger 164 reaches the end of the edge 95, the lower finger 166 engages the boss 100 to complete oscillation of the plate 90 to the position shown in FIG. 7 wherein images $12B_R$, $12B_L$ are aligned with the lenses 18R, 18L of the eyepieces 16R, 16L. The printed indicium B also moves into view through cutaway portion 82. Solid portions of the plate 90 obscure the view of the card 14 through the eyepieces 16 so that no images 12 can be viewed during most of the transition from images 12A to images 12B.

The flange 104 of the plate 90 comes into contact with the stop 105 when the images 12B and indicium B are so aligned, thereby limiting the forward oscillation of the plate 90. Once this stop point is reached, the user releases pressure on the actuator 158 by removing the index finger therefrom, and the spring 132 pulls the plate 90 back towards its rest position. Return movement of the plate forces the boss 100 upwardly against the finger 166 to move the actuator 158 towards its original, undepressed position. As return movement of the plate becomes substantially completed, the top edge 95 engages the top finger 164 to return the actuator 158 and the leg 162 completely to their original position shown in FIG. 6. Although the plate returns to its rest position, the card 14 is held in its advanced position by detent members 68, 70 which are in register with slots 26b, 26f.

Once the plate 90 returns to its original position, the window 102 on the plate 90 registers with image $12B_R$ while image $12B_L$ is completely unobscured by the plate 90 so such images can be viewed through the eyepieces. The trigger can be repeatedly actuated sequentially to advance the card 14 and view all seven pairs of images 12A–12G with their accompanying written indicia A–G.

Having illustrated and described the principles of the invention in a preferred embodiment, it should be apparent to those skilled in the art that the invention can be modified in arrangement and detail without departing from such principles. We claim all modifications coming within the spirit and scope of the following claims.

We claim:

1. A stereoscopic viewer for a plurality of discrete film images equally spaced peripherally around the edge of a disc-shaped carrying card, said film images being arranged in pairs of images which provide a stereoscopic effect when said pairs are viewed together, said card having a plurality of peripherally spaced openings through which said images are viewed, and a plurality of equally spaced radial slots, said viewer comprising:
 a housing having means for retaining said card in a viewing plane for rotation of said card about its axis, said housing as held for viewing including a bottom surface and a top surface;
 eyepiece means through said housing for viewing a pair of discrete images on said card aligned with said eyepiece means; and
 trigger means for rotating said card to position another pair of images in alignment with said eyepiece means, said trigger means including a depressible actuator vertically projecting through said top surface.

2. The viewer of claim 1 wherein said viewer further comprises:
 an advancing plate which is oscillatable, about an axis perpendicular to said plate, between a rest position in which one of said pairs of stereo images is viewed and an advanced position, said trigger means further comprising means for oscillating said plate from said rest to said advanced position, said plate being provided with engaging means for engaging in one of said radial slots on said card and incrementally rotating said card to display sequential images to said eyepiece means by incrementally rotating said card as said plate oscillates; and
 a spring means connected between said housing and said plate for biasing said plate into said rest position.

3. The viewer of claim 2 wherein said engaging means comprises a pawl on said plate for engaging in one of said radial slots on said card, said pawl having a flat leading face which engages an edge of said slot to advance said card when said plate oscillates in a card advancing direction, and a curved trailing face which disengages said pawl from said slot when said plate oscillates in a return direction, said pawl being inclined at an acute angle to said plate in said card advancing direction.

4. The viewer of claim 2 wherein said engaging means further comprises means for selectively engaging said card and holding it flat against said plate when said plate rotates in a desired direction of rotation of said card, and selectively disengaging said card when said plate oscillates in a return direction.

5. The viewer of claim 5 wherein said plate includes a hub, a substantially circular side and bottom edge, a partially flat top edge, a boss adjacent said hub, and a window means for viewing one of said discrete images on said card through said eyepiece means, and wherein said actuator comprises:
 an actuator portion projecting through said top surface of said housing for engagement by a finger of a user; and
 a leg depending from said actuator portion, said leg having a top finger means engaging said partially flat top edge of said plate when said plate is in said rest position for imparting initial oscillation to said plate in said desired direction, and a lower finger means for pushing said boss to complete said plate's movement to its advanced position.

6. The viewer of claim 2 wherein said plate includes a flat top edge portion, and said depressible actuator further includes edge engaging finger means for engaging said top edge portion and rotating said plate as aid actuator is depressed.

7. The viewer of clam 2 wherein said plate includes a hub and a boss adjacent said hub, and said depressible actuator includes boss engaging finger means for engaging said boss and rotating said plate as said actuator is depressed.

8. The viewer of claim 7 wherein said plate includes a flat top edge portion, and said depressible actuator further includes edge engaging fionger means for engaging said top edge porton and initiating rotation of said plate as said actuator is depressed.

9. The viewer of claim 8 wherein said edge engaging finger means further comprises means for engaging said top edge portion and initiating rotation of said plate before said boss engaging finger means engages said boss.

10. The viewer of claim 1 wherein said eyepiece means comprises a pair of tubular eyepieces separated by substantially the same distance as a pair of human eyes, each eyepiece including a magnifying lens, said viewer further comprising an opaque mask between said lenses and said disc, said mask ahving an opening in front of each lens, said opening being a sufficient size and distance from said card to allow viewing of only one framed image through each lens.

11. The viwer of claim 10 wherein said housing comprises a completely translucent rear element having a face with a peripheral flange, and an opaque front element having a face with a peripheral flange which mates with said peripheral flange of said rear face along substantially the entire peripheries of said flanges, said bottom surface of said housing being formed by said mating flanges and having a substantially semicircular shape, and said top surface comprising a first flat top part formed by said mating flanges above a first of said eyepieces, and a second flat top part formed by said mating flanges above a second of asid eyepieces, said second part being higher than said first part and defining a finger grip portion through which said depressible actuator verticaly projects, and a rectangular cutaway portion in said front face between said first and second parts through which a portion of said card can be seen.

12. The viewer of claim 1 wherein said housing comprises a completely translucent rear face against which said card rotates and an opaque front face, said eyepiece means being provided through said front face.

13. A stereoscopic viewer for a plurality of discrete film images equally spaced peripherally around the edge of a disc-shaped card, said film images being arranged in stereo-pairs of images which provide a stereoscopic effect when said pairs are viewed together through a pair of eyepieces each having a magnifying lens with a focal plane, said card having a plurality of equally spaced radial slots therearound and circularly arranged printed indicia thereon, said viewer comprising:
 a housing including a rear element and a front element, said rear element being completely translucent and having a rear face and a peripheral flange, said rear element having a substantially semicircular bottom portion, and a top portion comprising a first flat top part extending partially across said rear element above a first of said eyepieces, and a substantially rectangular finger grip defining portion extending across the remainder of said rear element above a second of said eyepieces and having a second flat top part with a height greater than the height of said first flat top part, said rear face carrying a detent comprised of a pair of indexing means for registering with a pair of said slots in said card to hold said card selectively stationary with said pair of images aligned in front of said eyepieces;

said front element including a flat opaque front face having a peripheral flange therearound which mates with said rear face peripheral flange along substantially the entire peripheries of said front and rear face flanges, said front element having a rectangular cutaway portion between said eyepieces through which said printed indicia on said card can be viewed, said front element having a finger grip defining portion opposing said finger grip defining portion of said rear element, said finger grip defining portions of said front and rear elements defining a trigger area therebetween, said front element also forming a cylindrical receptacle;

an advancing plate for incrementally advancing said card sequentially to view pairs of images on said card, said plate having a hub which projects into said receptacle and rotates relative thereto such that said plate is oscillatable about an axis perpendicular to said faces, between a rest position in which said pair of images are viewed through said eyepieces and an advanced position, said plate having a flat top trigger engaging portion projecting into and across said trigger area between said finger gripping portions of said front and back elements, said advancing plate being cut away adjacent said trigger engaging portion so as to extend below said cutaway portion and the bottom of said first eyepiece such that said plate does not obstruct said first eyepiece and the printed indicia on said card when said plate is in said rest position;

said plate further comprising a boss adjacent said hub in the direction of said trigger engaging portion, and a window means in register with said second eyepiece when said plate is in said rest position for framing one of said pair of images;

spring means connected between said plate and said front face for biasing said plate toward said rest position;

trigger means for moving said plate from said rest to said advanced position, said trigger means including:
- a cylindrical actuator extending through said peripheral flange on said second flat top part of said front element and projecting upwardly from said finger grip member;
- a leg depending from said cylindrical actuator, said leg having a finger means engaging said flat top trigger engaging portion of said plate when said plate is in said rest position for imparting initial rotation to said plate, and lower finger means for pushing said boss to complete said movement of said plate to said advanced position, said lower finger means being out of engagement with said boss when said plate is in said rest position;

engaging means on said plate for engaging and rotating said card as said plate moves from said rest to said advanced position, said engaging means comprising a yieldable arm on said plate, said arm carrying a pawl for engaging in one of said slots on said card, said pawl having a flat leading face which engages an edge of said slot to advance said card when said plate rotates from said rest to said advanced position, and a curved trailing face which disengages said pawl from said slot when said plate returns to said rest position, said pawl being inclined at an acute angle to said plate in the direction said plate moves to reach said advanced position; and an opaque mask in front of said focal plane of said lenses between said lenses and said card, said mask having an opening in front of each lens, each opening being a sufficient size and distance from said card to allow viewing of only one framed image through each lens.

* * * * *

UNITED STATES PATENT AND TRADEMARK OFFICE
CERTIFICATE OF CORRECTION

PATENT NO. : 4,726,653

DATED : February 23, 1988

INVENTOR(S) : MARTIN THALER, ALAN G. LEWIS and DAVID M. GRESHAM

It is certified that error appears in the above-identified patent and that said Letters Patent is hereby corrected as shown below:

In the Specification:

Column 4, line 10, "opposte" should be --opposite--.

Column 4, line 53, "8" should be --38--.

Column 7, line 40, "mechamism" should be --mechanism--.

In the Claims:

Claim 5, at column 9, line 48, "5" should be --2--.

Claim 6, at column 9, line 67, "aid" should be --said--.

Claim 8, at column 10, line 8, "fionger" should be --finger--.

Claim 10, column 10, line 21, "ahving" should be --having--.

Claim 11, column 10, line 25, "viwer" should be --viewer--.

Claim 11, column 10, line 36, "asid" should be --said--.

Signed and Sealed this

Sixth Day of September, 1988

Attest:

DONALD J. QUIGG

*Attesting Officer*  *Commissioner of Patents and Trademarks*